W. A. KIPER.
NUT LOCK.
APPLICATION FILED SEPT. 19, 1921.
1,433,382.
Patented Oct. 24, 1922.
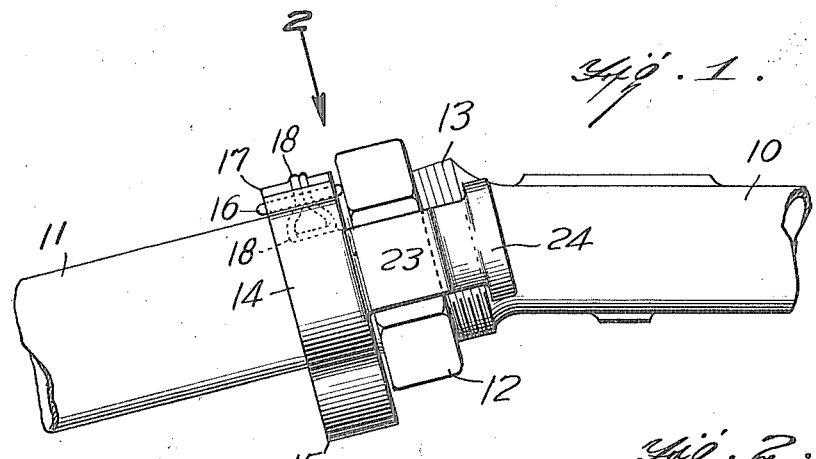
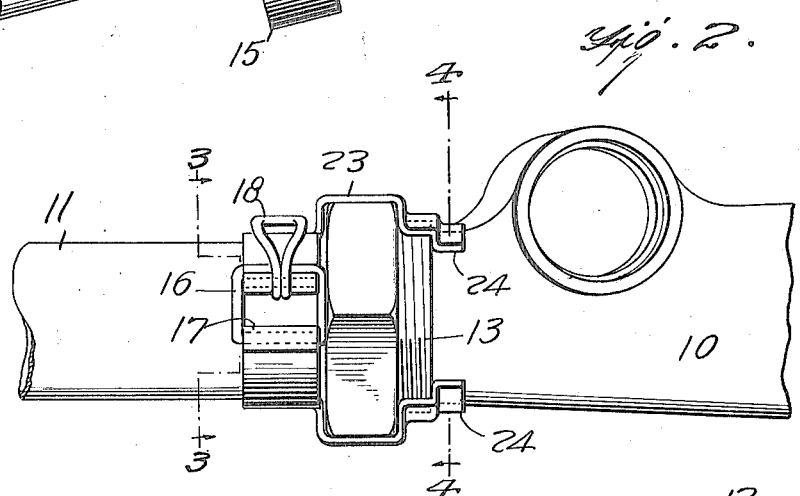
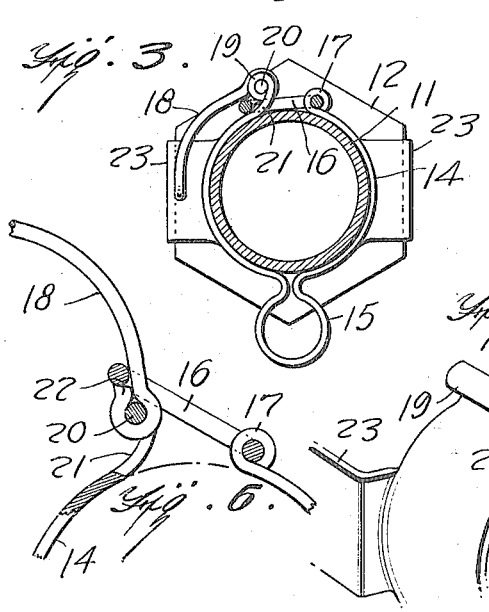
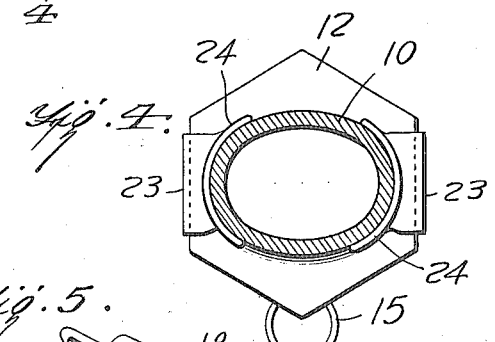
Inventor
W. A. KIPER,
By Franklin H. Hough
Attorney Patented Oct. 24, 1922.

1,433,382

UNITED STATES PATENT OFFICE.

WOODFORD A. KIPER, OF CARROLLTON, KENTUCKY.

NUT LOCK.

Application filed September 19, 1921. Serial No. 501,547.

*To all whom it may concern:*

Be it known that I, WOODFORD A. KIPER, a citizen of the United States, residing at Carrollton, in the county of Carroll and State of Kentucky, have invented certain new and useful Improvements in Nut Locks, of which the following is a specification, reference being had therein to the accompanying drawings.

This invention relates to pipe fitting locks and has for an object to provide a device for use especially with pipes to lock a fitting which is interposed between two sections of pipe or equivalent members to prevent the coupling from becoming loosened from said pipe sections or either of them.

A further object of the invention is to provide a lock more especially, though not exclusively, intended for locking a union whereby two sections of pipes are coupled.

A further object of the invention is to provide a lock which clamps over the pipes at both sides of and spans the coupling whereby both sections of the pipe and the coupling are locked into an organized structure.

A further object of the invention is to provide a device especially adapted for use in connecting the exhaust line with the exhaust manifold of an automotive vehicle and to lock the coupling so that said coupling is not loosened by the vibration of the operation of the machine.

With these and other objects in view the invention comprises certain novel parts, elements, units, combinations, functions and arrangements, as disclosed in the drawing, together with mechanical equivalents thereof, as will be hereinafter more fully described and claimed.

Figure 1 is a view in side elevation of a fragment of an exhaust manifold and exhaust line with the union thereon coupled by means of the present invention, shown in side elevation; Figure 2 is a top plan view of the same fragment of the manifold exhaust line union and lock;

Figure 3 is a transverse sectional view through the exhaust line and lock taken on line 3—3 of Figure 2;

Figure 4 is a transverse sectional view through the exhaust manifold and lock, taken on line 4—4 of Figure 2;

Figure 5 is a perspective view of the lock shown in open position, ready to be clamped upon the line and manifold, and, Figure 6 is a detail fragmentary view showing the relation of the latch and link.

Like characters of reference indicate corresponding parts throughout the several views.

It is well known that in many, if not all, makes of automobiles the exhaust manifold, indicated conventionally at 10, is connected with the exhaust line 11 by means of a union 12. The union is usually of the threaded type engaging the threads 13 upon the manifold structure and by reason of the vibration of the machine and other parts becomes loosened and displaced.

To prevent the loosening of the union, the present invention is provided comprising a band 14 preferably made continuous with a spring loop 15, whereby the band is proportioned to be clamped about the exhaust line 11. This clamping is provided by means of a link 16 pivoted in an eye 17 of the band with a latch member 18 proportioned to be inserted through the loop, as shown at Figure 5, and pivoted to the end of the band 14 opposite the link 16 by means of a sleeve 19 the latch being pivoted in such sleeve by means of a pintle 20 which may or may not be integral with the latch as occasion or manufacture may make desirable. The sleeve 19 is upturned from the band by a bend 21 so that after the latch has been rotated substantially 90° from the position shown at Figure 5 to the position shown at Figure 3, the link 16 is moved downwardly to latch over the sleeve 19 and to bear against the shoulders 22 formed integral or rigid with the latch 18, as shown at Figure 6.

The band 14 is also provided with arms 23 so proportioned that when the band 14 is clamped upon the line 11 the arms 23 will clamp the sides of the union 12, as shown in the drawing. The arms 23 are continued to form segments 24, which, extending beyond the union 12, clamp the manifold 10 and by reason of its non-circular shape, as shown more particularly at Figure 4, prevent the rotation of the structure relative to the manifold, even though the line itself might rotate with or separately from the union 12. In other words the clamp, clamping as it does upon the line 11 and upon the manifold 10 embracing the union 12, clamps rigidly and firmly upon all three of said units.

To release the device from clamping position, the latch 18 is rotated from the position shown at Figure 3 to the position shown at Figure 5, whereupon by reason of the shoulders 22 being positioned under the link 16, as shown more particularly at Figure 6, the link will be lifted over the sleeve 19 and released, permitting the resiliency of the band to spread to the position shown at Figure 5, whereupon it may be removed from the line and union, or while in that position be replaced.

What I claim is:

1. A nut lock comprising a band having means for clamping about a cylindrical member, arms extending from the band proportioned to clamp a nut, and extensions carried upon the arms proportioned to clamp an engaging member upon the side of the nut opposite the cylindrical member.

2. A coupling lock comprising a band proportioned to be clamped about a pipe, arms carried by the band extending approximately in parallelism proportioned to clamp upon opposite sides of a coupling, and extensions formed upon the arms proportioned to clamp a conduit upon the side of the coupling opposite the pipe.

3. A union lock comprising a band composed of spring material proportioned to be latched about a pipe, arms extending from opposite sides of the band substantially in parallelism and proportioned to clamp opposite sides of the union, and extensions formed at the extremities of the arms having concave members proportioned to clamp the conduit upon the side of the union opposite the pipe.

4. A union clamp comprising in combination with juxtaposed conduits and a union coupling, members extending along and upon opposite sides of the union and connected with members clamping the conduit upon opposite sides of said union.

In testimony whereof I hereunto affix my signature in presence of two witnesses.

WOODFORD A. KIPER.

Witnesses:
 WM. LEATHERAGE,
 R. P. HANDY.